United States Patent
Khirallah et al.

(10) Patent No.: US 10,798,750 B2
(45) Date of Patent: Oct. 6, 2020

(54) COMMUNICATION SYSTEM

(71) Applicant: NEC Corporation, Tokyo (JP)

(72) Inventors: Chadi Khirallah, Epsom (GB); Vivek Sharma, Sutton (GB); Yassin Aden Awad, Uxbridge (GB); Robert Arnott, London (GB)

(73) Assignee: NEC CORPORATION, Minato-ku, Tokyo (JP)

( * ) Notice: Subject to any disclaimer, the term of this patent is extended or adjusted under 35 U.S.C. 154(b) by 4 days.

(21) Appl. No.: 15/750,987

(22) PCT Filed: Sep. 7, 2016

(86) PCT No.: PCT/JP2016/004070
§ 371 (c)(1),
(2) Date: Feb. 7, 2018

(87) PCT Pub. No.: WO2017/043074
PCT Pub. Date: Mar. 16, 2017

(65) Prior Publication Data
US 2018/0242357 A1 Aug. 23, 2018

(30) Foreign Application Priority Data
Sep. 10, 2015 (GB) .................................. 1516065.8

(51) Int. Cl.
*H04W 74/08* (2009.01)
*H04L 5/00* (2006.01)
(Continued)

(52) U.S. Cl.
CPC ......... *H04W 74/085* (2013.01); *H04L 1/1812* (2013.01); *H04L 5/0053* (2013.01);
(Continued)

(58) Field of Classification Search
None
See application file for complete search history.

(56) References Cited

U.S. PATENT DOCUMENTS

2015/0092702 A1    4/2015  Chen et al.
2015/0365931 A1   12/2015  Ng et al.
(Continued)

FOREIGN PATENT DOCUMENTS

| JP | 2014-220769 A | 11/2014 |
| WO | 2014/113067 A1 | 7/2014 |
| WO | 2015/190844 A1 | 12/2015 |

OTHER PUBLICATIONS

3GPP TS 36.213, V.12.6.0 (Jun. 2015), Technical Specification, "3rd Generation Partnership Project; Technical Specification Group Radio Access Network; Evolved Universal Terrestrial Radio Access (E-UTRA); Physical layer procedures (Release 12)", Jun. 2015, pp. 1-241.

(Continued)

Primary Examiner — Saumit Shah
(74) Attorney, Agent, or Firm — Sughrue Mion, PLLC

(57) ABSTRACT

A communication system is disclosed in which a communication device communicates with communication apparatus that operates a cell within which the communication device is located. The cell is operated as a licensed assisted access (LAA) cell and has an associated physical uplink control channel (PUCCH). The communication device has a controller that is adapted to: generate a control signal for transmitting to said communication apparatus; perform a clear channel assessment (CCA) on said PUCCH before the control signal is transmitted; and block transmission of the control signal on said PUCCH when said CCA indicates that said channel is not clear. The communication device is further adapted, when said controller has not blocked said (Continued)

transmission of the control signal, to transmit the control signal to said communication apparatus in said PUCCH.

17 Claims, 9 Drawing Sheets

(51) Int. Cl.
*H04L 1/18* (2006.01)
*H04W 72/04* (2009.01)
*H04W 72/14* (2009.01)
*H04W 74/00* (2009.01)
*H04W 72/12* (2009.01)
*H04W 16/14* (2009.01)

(52) U.S. Cl.
CPC ....... *H04W 72/0406* (2013.01); *H04W 72/14* (2013.01); *H04W 74/004* (2013.01); *H04W 74/0808* (2013.01); *H04L 5/001* (2013.01); *H04L 5/0055* (2013.01); *H04W 16/14* (2013.01); *H04W 72/1284* (2013.01); *Y02D 70/00* (2018.01); *Y02D 70/1262* (2018.01); *Y02D 70/1264* (2018.01); *Y02D 70/142* (2018.01); *Y02D 70/21* (2018.01); *Y02D 70/25* (2018.01)

(56) References Cited

U.S. PATENT DOCUMENTS

| | | | |
|---|---|---|---|
| 2016/0227578 A1* | 8/2016 | Lee | H04W 74/004 |
| 2017/0027002 A1* | 1/2017 | Yerramalli | H04W 74/004 |
| 2018/0077749 A1* | 3/2018 | Yamada | H04W 76/38 |
| 2018/0098353 A1* | 4/2018 | Lee | H04W 4/08 |

OTHER PUBLICATIONS

3GPP TSG RAN WG1 Ad-hoc Meeting, R1-151134, "On UCI Design for LAA," Ericsson, Mar. 24-26, 2015, 7 pages.
3GPP TSG RAN WG1 Meeting #81, R1-152816, "On the remaining PHY issues for LAA UL operation," Nokia Networks, May 25-29, 2015, 4 pages.
3GPP TSG RAN WG1 Meeting #81, R1-153139, "On UCI Design for LAA with DL and UL Transmissions," Ericsson, May 25-29, 2015, 3 pages.
3GPP TSG RAN WG1 Meeting #82, R1-154073, "On LAA CSI related Issues," ZTE, Aug. 24-28, 2015, pp. 1-3.
Written Opinion of the International Searching Authority of PCT/JP2016/004070 dated Nov. 24, 2016.
International Search Report of PCT/JP2016/004070 dated Nov. 24, 2016.
Samsung, "Remaining issues on interleaved SR", 3GPP TSG RAN WG2 #91, Aug. 24-28, 2015, R2-153417, pp. 1-3 (total 3 pages).
Communication dated Feb. 20, 2019 from Japanese Patent Office in counterpart JP Application No. 2018-530990.
Decision of Refusal dated Jun. 26, 2019 from the Japanese Patent Office in application No. 2018-530990.
Huawei, HiSilicon, "Support of UL transmission for LAA", 3GPP TSG RAN WG1 Meeting #80bis, Apr. 20-24, 2015, R1-151302, 6 pages.
NTT Docomo, "An LTE Communication Experiment Conducted in the Unlicensed Frequency Band", Press Release Material, Aug. 21, 2014, https://www.nttdocomo.co.jp/info/news_release/2014/08/21_00.html, pp. 1-2.

* cited by examiner

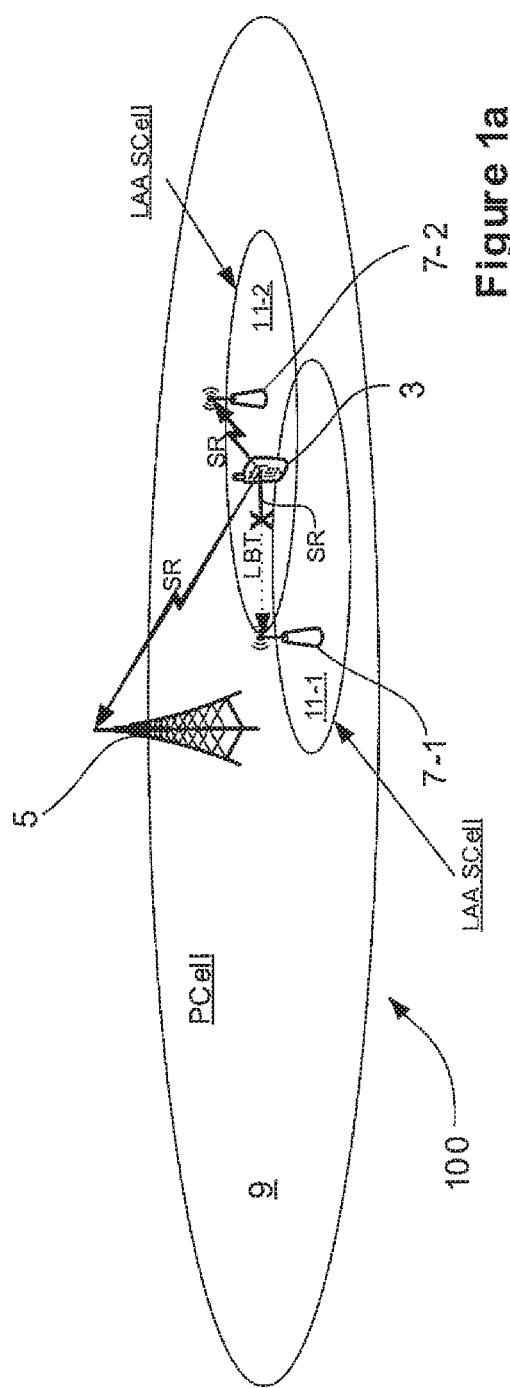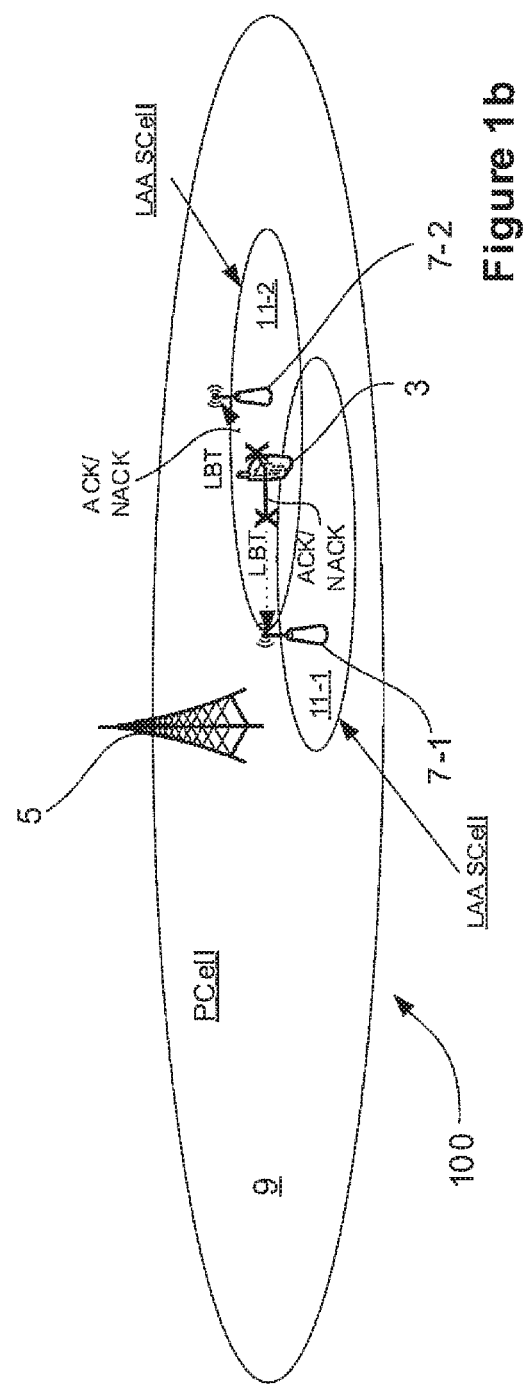

[Fig. 2]
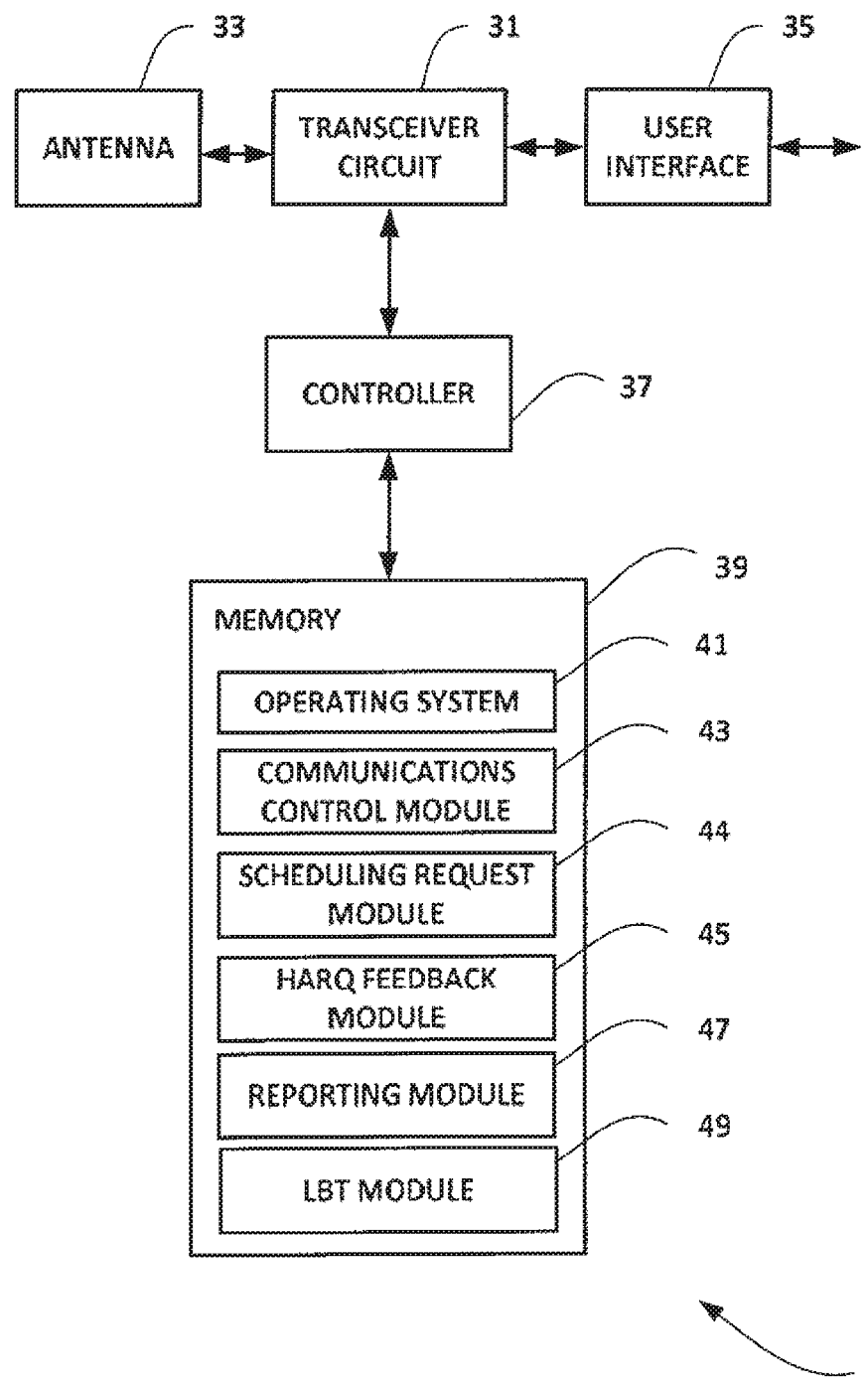

[Fig. 3]
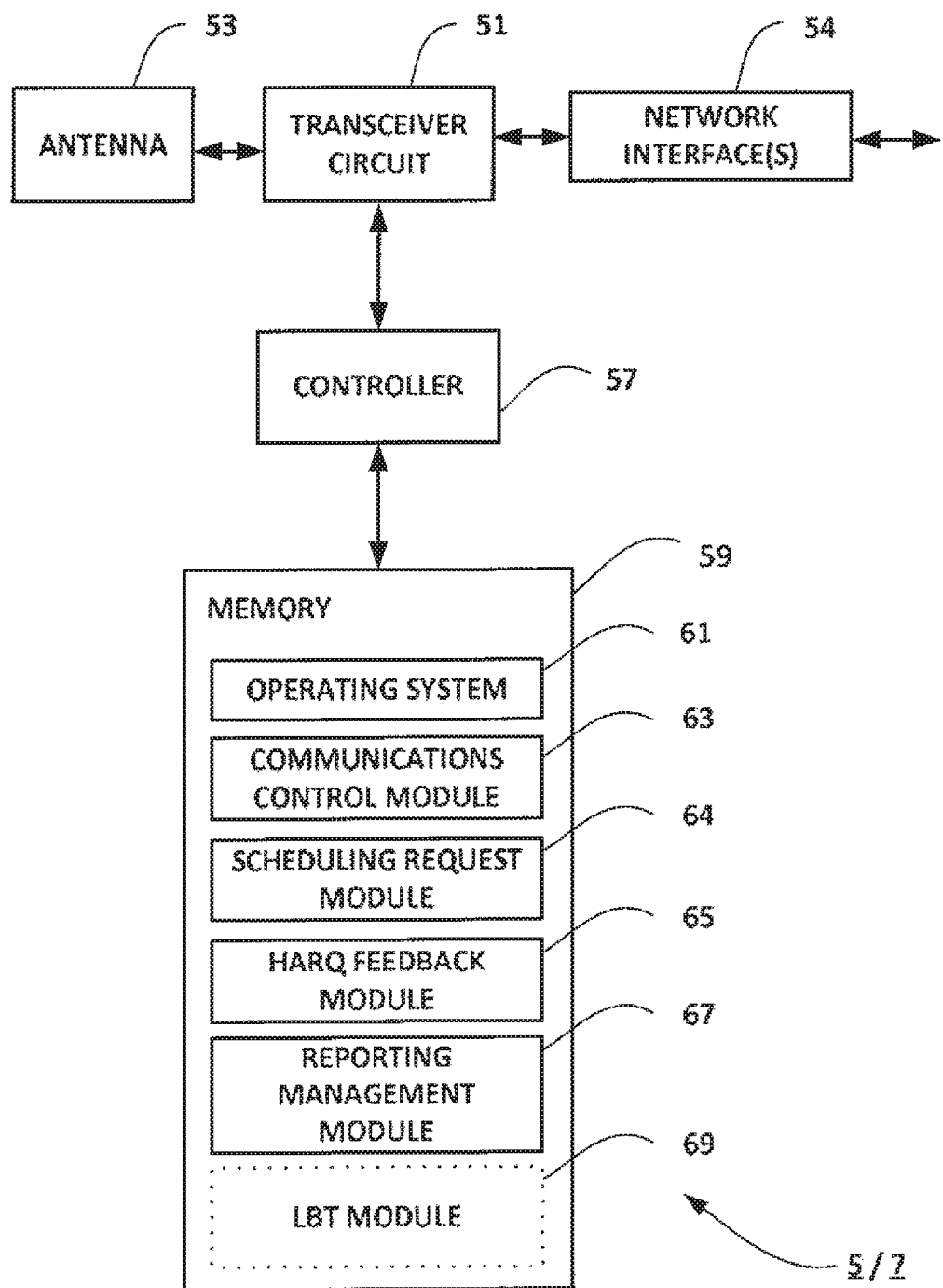

[Fig. 4]
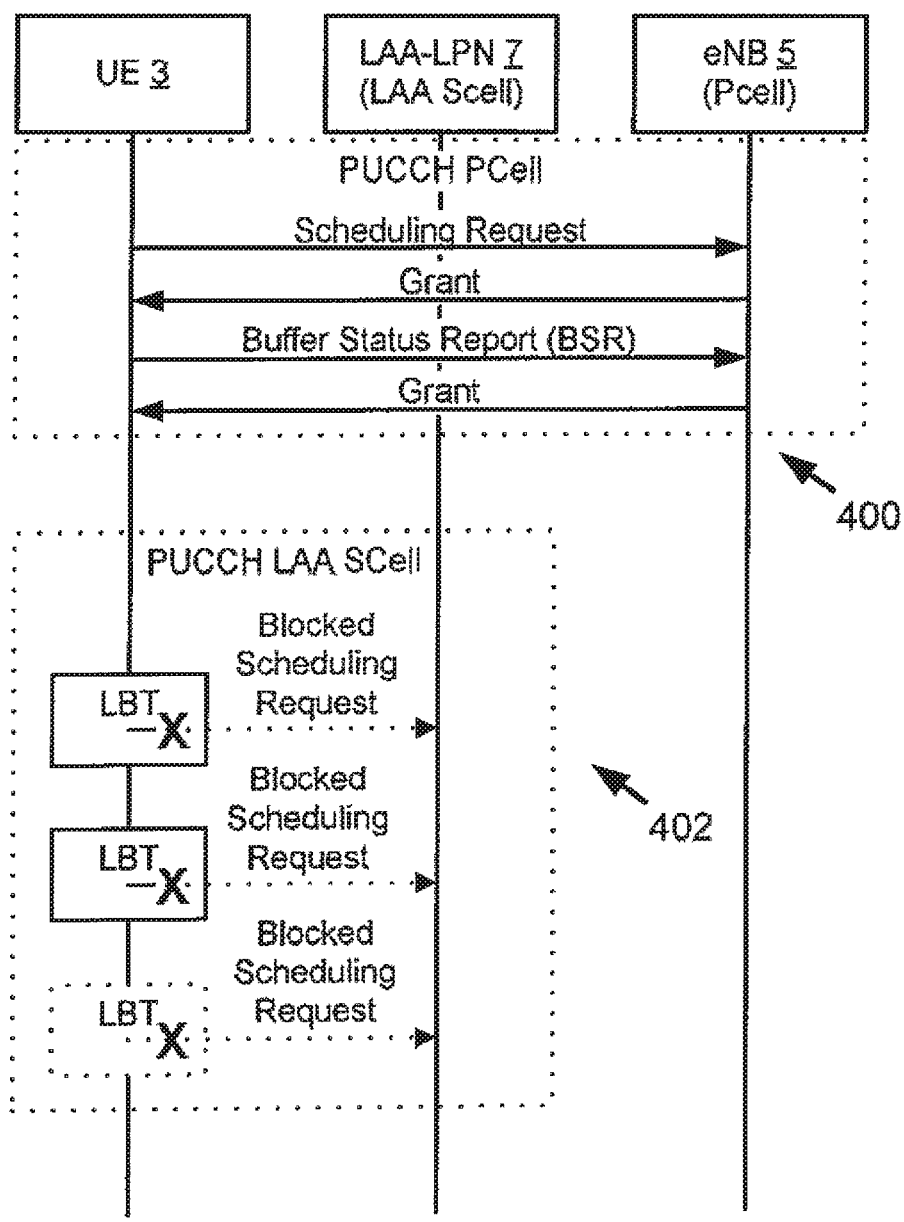

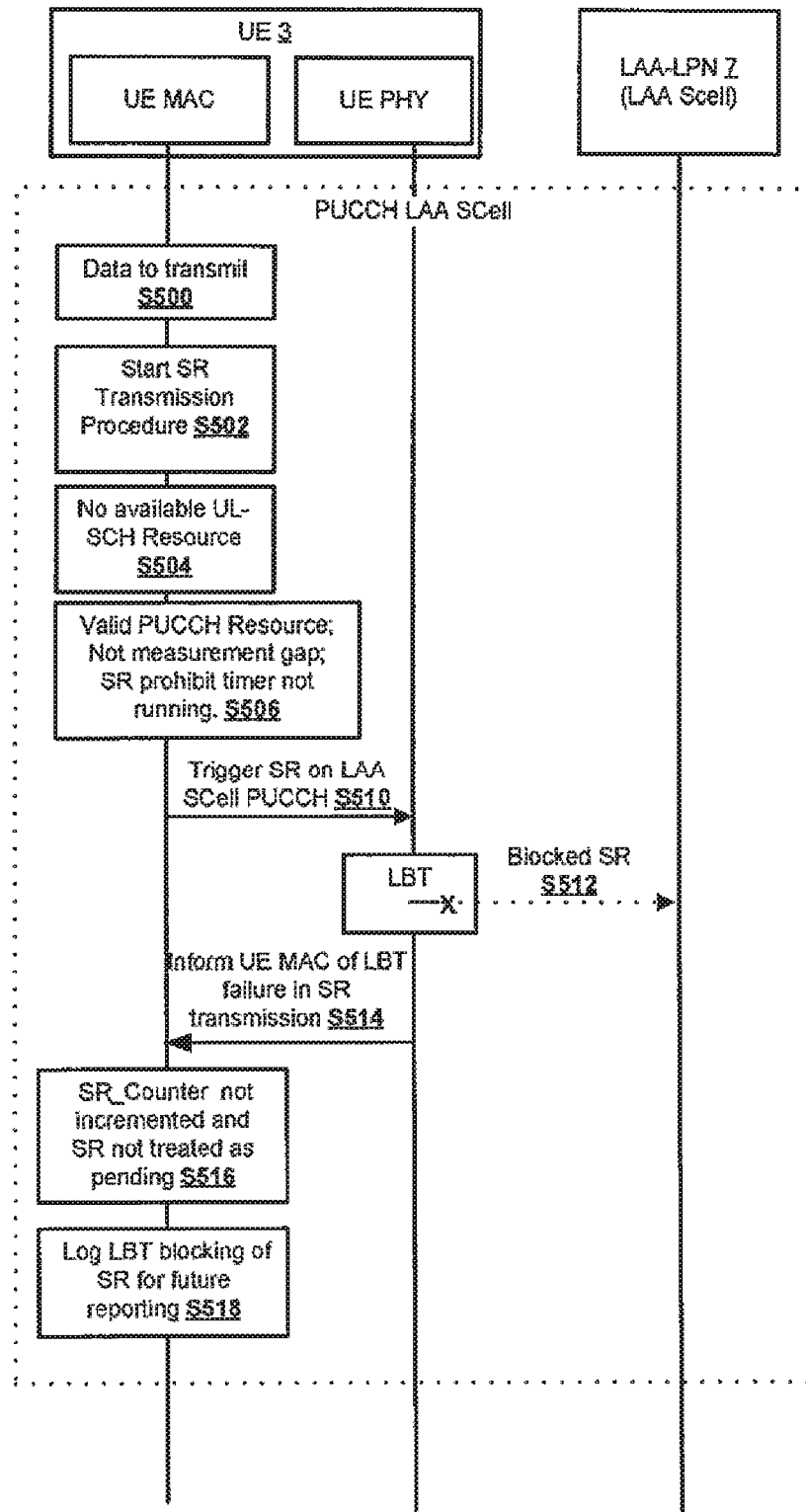

[Fig. 6]
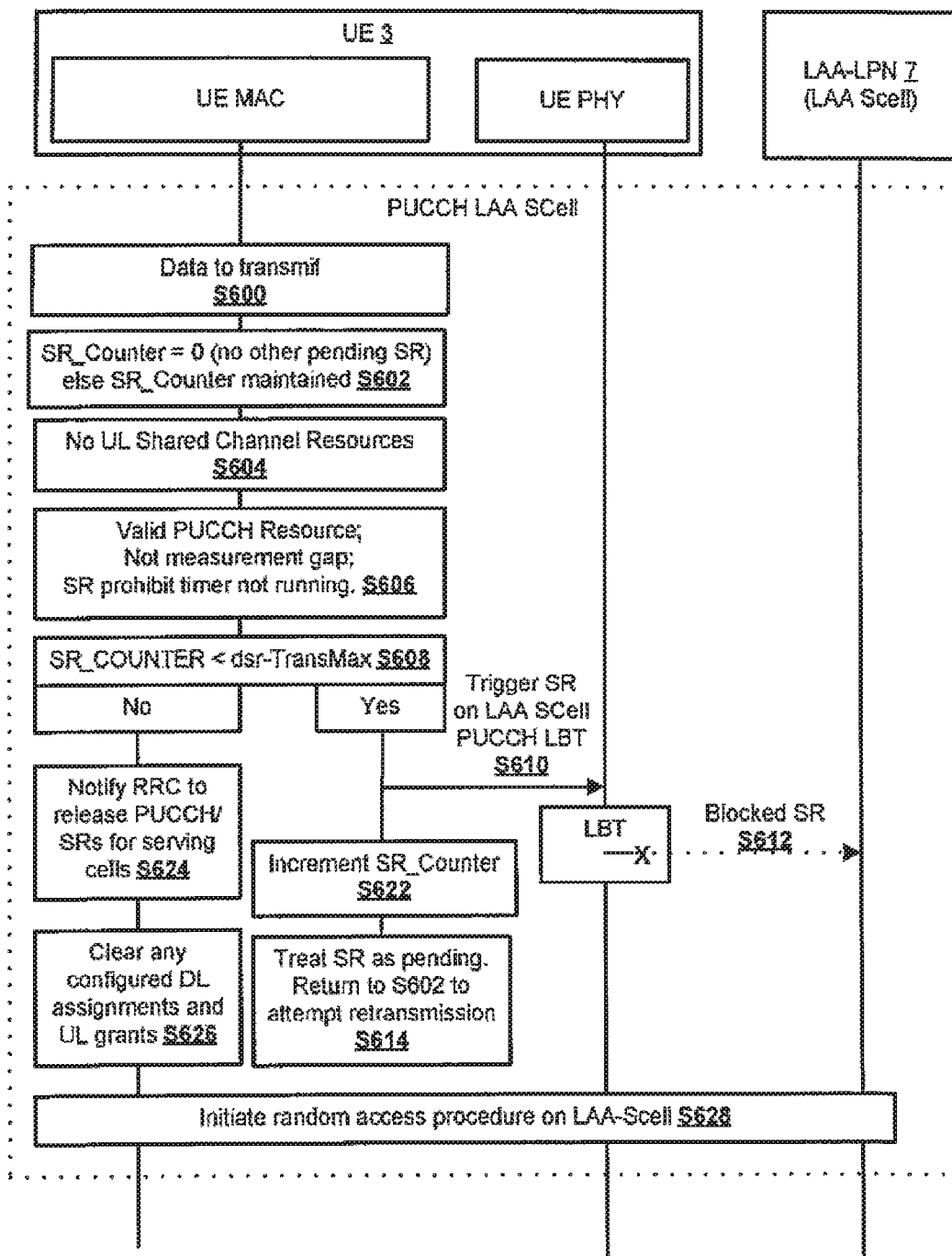

[Fig. 7]
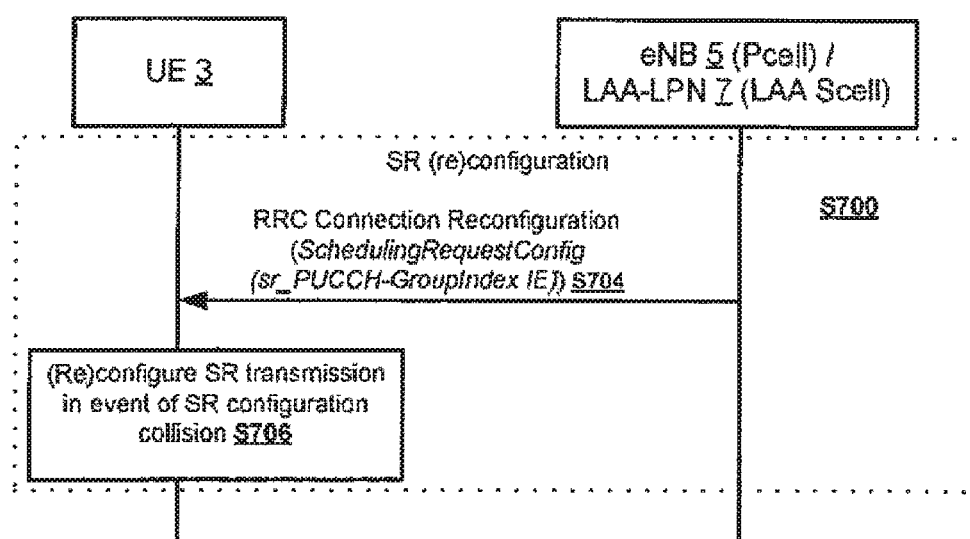

[Fig. 8]
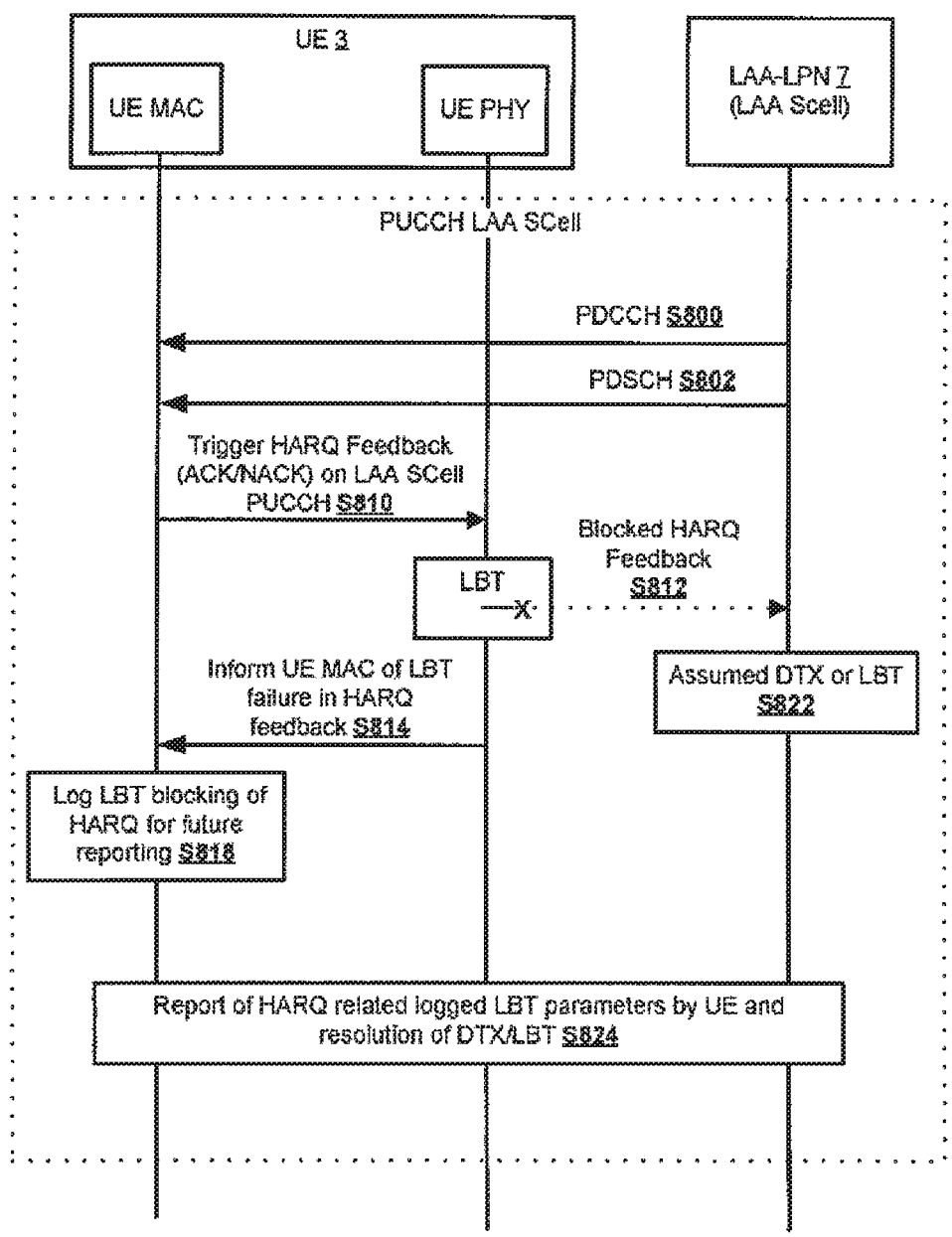

[Fig. 9]
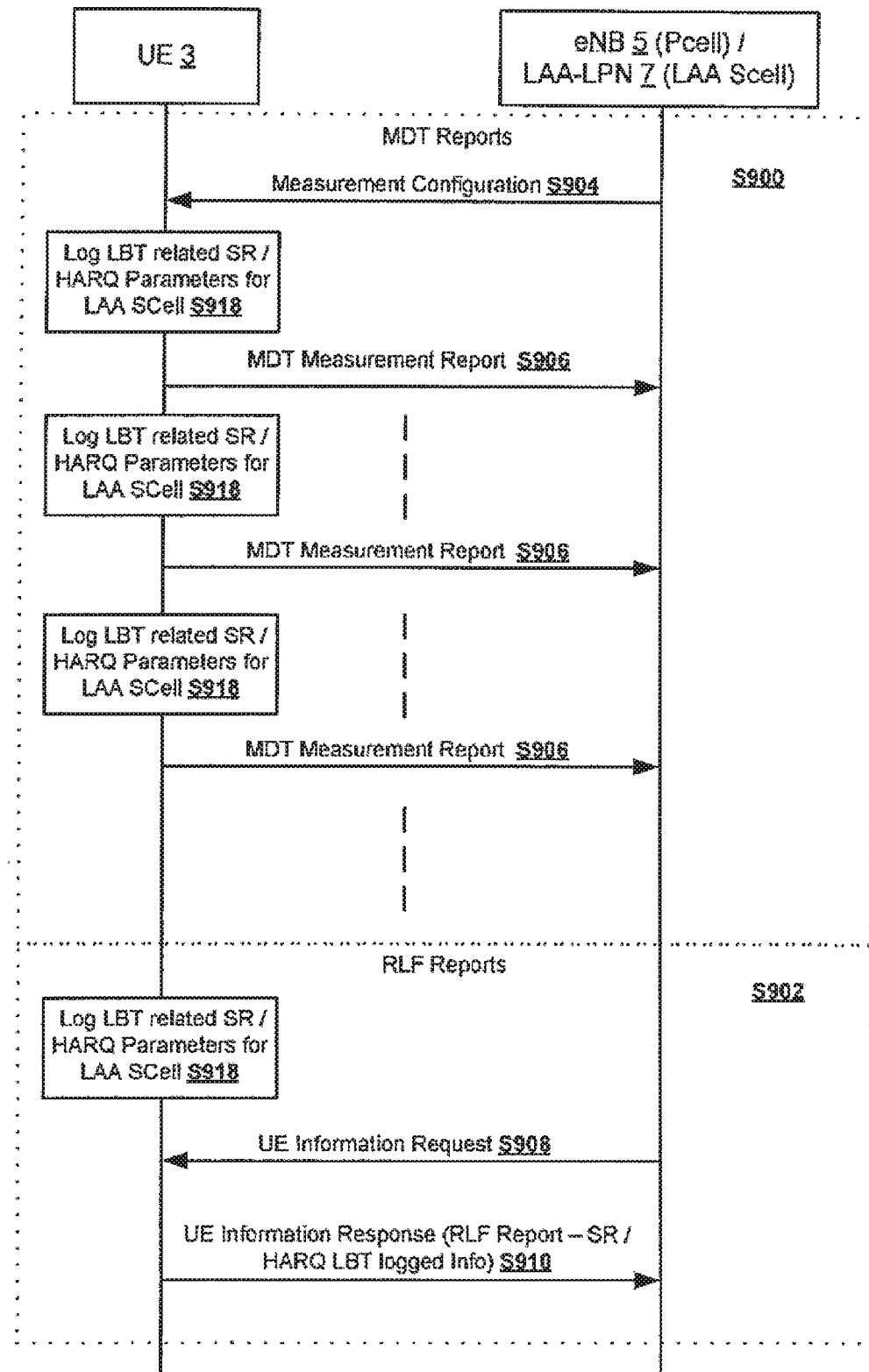

COMMUNICATION SYSTEM

CROSS REFERENCE TO RELATED APPLICATIONS

This application is a National Stage of International Application No. PCT/JP2016/004070 filed Sept. 7, 2016, claiming priority based on British Patent Application No. 1516065.8 filed Sept. 10, 2015, the contents of all of which are incorporated herein by reference in their entirety.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof, such as the Universal Terrestrial Radio Access Network (UTRAN) and the Long Term Evolution (LTE) of UTRAN (E-UTRAN), including LTE-Advanced. The invention has particular although not exclusive relevance to the implementation of Physical Uplink Control Channels (PUCCH) in carrier aggregation scenarios.

BACKGROUND ART

LTE, more recently incorporating the enhancements of LTE-A, has proved to be an extremely successful platform for meeting the increasing demand for wireless broadband data capabilities. In parallel with this continuing increase in demand, LTE related technologies have been enhanced further with new features such as carrier aggregation (CA) in which a plurality of component carriers (CC) are aggregated to increase the total bandwidth available to items of user equipment (UEs) such as conventional mobile (cellular) communication devices (cell phones, mobile telephones, smartphones etc.) and machine type communication (MTC) devices.

Carrier aggregation can be used to provide a 'primary' cell (PCell), on a so-called 'primary' component carrier (PCC) and one or more secondary cells (SCells) on other 'secondary' component carriers (SCC). Downlink control signalling (e.g. on a Physical Downlink Control Channel, 'PDCCH', or an enhanced PDCCH, 'ePDCCH') may be provided on any component carrier in any serving cell. However, downlink control signalling may be provided one carrier in one cell (e.g. the PCell) may be used for scheduling resources on other carriers. Such scheduling is referred to as cross-carrier scheduling.

Another enhancement provided in LTE is the development of heterogeneous network comprising a combination of one or more large 'macro' cells each provided via an associated macro base station (macro-eNB) with one or more smaller cells. Each smaller cell is provided via a low-power node (LPNs). An LPN may comprise any communication node that is capable of providing a small cell, for example a low power base station ('eNB' in LTE), home base station ('HeNBs' in LTE), relay node (RN), remote radio head (RRH), or the like. Small cells are primarily added to increase capacity in hot spots with high user demand and to fill in areas not covered by the macro network—both outdoors and indoors. They can also improve network performance and service quality by offloading from the large macro-cells. Whilst these small cells can be provided as essentially independent cells they are typically provided as SCells located within (or overlapping with) a PCell provided by an associated macro base station and may be controlled by that macro base station.

Historically, for deployments involving carrier aggregation, uplink control information (UCI) such as and hybrid automatic repeat request (ARQ) acknowledgments (ACKs) and negative acknowledgments (NACKs), and scheduling requests (SRs), were provided in a single physical uplink control channel (PUCCH) in the PCell only. Such a configuration was, however, considered unsuitable for dual connectivity scenarios, in which a master base station (MeNB) provides control plane communication in a PCell and a secondary base station (SeNB) provides user plane communication in one or more SCells. Accordingly, a PUCCH was developed, for dual connectivity scenarios, on a special SCell (referred to as the Primary SCell or PSCell) of the SeNB. More recently it has been decided to specify a separate PUCCH for SCells of carrier aggregation deployments based on the UCI mechanism for dual connectivity.

As demand increases, there continues to be an increasing need for yet further features that complement existing LTE/LTE-Advanced technology and can be used to enhance their service further. This has led to unlicensed or 'public' spectrum (typically in the 5 GHz band) being considered as a potential source of further enhancements. Whilst the benefits of communication via unlicensed spectrum cannot currently compare to those provided via a licensed regime, the efficient use of unlicensed spectrum as a complement to the use of licensed spectrum has the potential to enhance significantly the overall service provided. The technique of using unlicensed 'public' spectrum, in combination with licensed spectrum, to augment conventional (LTE) provision via a licensed band is referred to as licensed-assisted access (or LAA).

In most countries, regulatory requirements exist which seek to minimize the potential interference between users of the unlicensed spectrum. Even where regulatory requirements are not particularly strict the fair coexistence between LTE and other technologies such as Wi-Fi is considered necessary. It is not, therefore, enough to minimize interference simply to meet regulatory requirements—it is also important that a deployed system will operate as a "good neighbour" and not, therefore, significantly impact other users of the unlicensed spectrum.

One mechanism for coexistence is the so called 'listen-before-talk' (LBT) mechanism, which governs when communication equipment may access a channel on an unlicensed band. For example, according to the European regulations for load-based equipment, clear channel assessment (CCA) (also referred to as channel sensing, 'CS') must be performed prior to starting a new transmission. CCA involves listening to the communication channel to determine whether it is occupied before transmitting on that channel. An extended CCA may be performed if, on listening to the channel, the communication medium is determined to be occupied during the initial CCA, and transmission is then postponed until the channel is considered clear.

SUMMARY OF INVENTION

Technical Problem

However the introduction of LAA to LTE communication networks (and potentially similar networks using non-LTE technology) presents a number of challenges and introduces potential conflicts with existing technology that will have to be resolved before such technology can be deployed successfully.

The present invention seeks to provide a communication device and associated apparatus and methods for at least partially addressing the above issues.

Solution to Problem

In one aspect, the invention provides a communication device for a communication system, the communication device comprising: a transceiver adapted to communicate with communication apparatus that operates a cell within which the communication device is located, wherein the cell is operated as a licensed assisted access, LAA, cell and has an associated physical uplink control channel (PUCCH); and a controller adapted: to generate at least one control signal for transmitting to said communication apparatus; to perform a clear channel assessment (CCA) (or other LBT action) on said PUCCH before said at least one control signal is transmitted; to block transmission of said at least one control signal on said PUCCH when said CCA (or other LBT action) indicates that said channel is not clear; wherein the transceiver is further adapted, when said controller has not blocked said transmission of said at least one control signal, to transmit said at least one control signal to said communication apparatus in said PUCCH.

In another aspect, the invention provides communication apparatus for a communication system, the communication apparatus comprising: a controller adapted: to operate a cell via which at least one communication device can communicate with the communication apparatus, wherein the cell is operated as a licensed assisted access, LAA, cell and has an associated physical uplink control channel (PUCCH); and to receive at least one control signal from said communication apparatus in said PUCCH.

In one aspect, the invention provides a method performed by communication device of a communication system, the method comprising: communicating with communication apparatus that operates a cell within which the communication device is located, wherein the cell is operated as a licensed assisted access, LAA, cell and has an associated physical uplink control channel (PUCCH); generating at least one control signal for transmitting to said communication apparatus; performing a clear channel assessment (CCA) on said PUCCH; blocking transmission of said at least one control signal on said PUCCH when said CCA indicates that said channel is not clear; and transmitting said at least one control signal to said communication apparatus in said PUCCH when said transmission is not blocked.

In another aspect, the invention provides a method performed by communication apparatus of a communication system, the method comprising: operating a cell via which at least one communication device can communicate with the communication apparatus that operates, wherein the cell is operated as a licensed assisted access, LAA, cell and has an associated physical uplink control channel (PUCCH); and receiving at least one control signal from said communication apparatus in said PUCCH.

In one aspect, the invention provides a communication device for a communication system, the communication device comprising: a transceiver adapted to communicate with communication apparatus that operates a cell within which the communication device is located, wherein the cell is operated as a cell in an unlicensed part of a frequency spectrum and has an associated physical uplink control channel (PUCCH).

In one aspect, the invention provides communication apparatus for a communication system the communication apparatus comprising: a controller adapted to operate a cell via which at least one communication device can communicate with the communication apparatus; and a transceiver adapted to receive a report (e.g. an (immediate) Minimisation of Drive Tests (MDT) and/or Radio Link Failure (RLF) report) of at least one scheduling request related parameter; wherein said controller is operable to generate, based on said at least one scheduling request related parameter, information for configuring said communication device to transmit an SR on a first PUCCH of a plurality of different PUCCHs, in preference to a second PUCCH of said plurality different PUCCHs, in the event that a timing configured for transmitting an SR on said first PUCCH coincides with a timing configured for transmitting an SR on said second PUCCH; and wherein said transceiver is adapted to send said information to said at least one communication device.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Exemplary embodiments of the invention will now be described by way of example only with reference to the attached figures in which:

BRIEF DESCRIPTION OF DRAWINGS

FIGS. 1a and 1b illustrate schematically a cellular telecommunication system to which exemplary embodiments of the invention may be applied:

FIG. 2 is a block diagram of a mobile device forming part of the system shown in FIG. 1;

FIG. 3 is a block diagram of a base station forming part of the system shown in FIG. 1;

FIG. 4 is a simplified message sequence diagram illustrating a procedure that may be implemented in the telecommunication system of FIG. 1;

FIG. 5 is a simplified message sequence diagram illustrating a procedure that may be implemented in the telecommunication system of FIG. 1;

FIG. 6 is a simplified message sequence diagram illustrating a procedure that may be implemented in the telecommunication system of FIG. 1;

FIG. 7 is a simplified message sequence diagram illustrating a procedure that may be implemented in the telecommunication system of FIG. 1;

FIG. 8 is a simplified message sequence diagram illustrating a procedure that may be implemented in the telecommunication system of FIG. 1; and FIG. 9 is a simplified message sequence diagram illustrating a procedure that may be implemented in the telecommunication system of FIG. 1.

DESCRIPTION OF EMBODIMENTS

<Overview>

FIGS. 1a and 1b schematically illustrate a mobile (cellular) telecommunication network 100 in which a mobile device 3 (or other such user equipment) can communicate with other such devices and/or other communication entities via a E-UTRAN base station 5, operating an associated primary cell (PCell) 9 on a primary component carrier (PCC), and/or any of a number of low power nodes (LPNs) 7-1, 7-2 operating respective secondary cells (SCells) 11-1, 11-2 on associated secondary component carriers (SCCs). Communication via the base station 5 and/or LPNs 7 is typically routed through a core network (not shown) which is accessed using an E-UTRA radio access technology (RAT). As those skilled in the art will appreciate, whilst one mobile device 3, one base station 5 and two LPNs 7 are shown in FIG. 1 for illustration purposes, the system, when implemented, will typically include other base stations, LPNs and mobile devices.

The low power nodes (LPNs) 7-1, 7-2 operate their respective secondary cells (SCells) 11-1, 11-2 on SCCs in unlicensed spectrum (e.g. in the 5 GHz band) in accordance with licensed assisted access (LAA) protocols. Accordingly, the SCells are operated as LAA SCells that are subject to listen-before-talk (LBT) requirements that necessitate the performance of clear channel assessment (CCA)/channel sensing (CS).

Each LPN 7 may comprise a communication node that is capable of providing a small cell on unlicensed spectrum, for example a low power base station ('eNB'), home base station ('HeNBs'), relay node (RN), remote radio head (RRH), or the like.

The mobile device 3 comprises a medium access control layer (MAC) entity and a physical layer (PHY) entity. The MAC entity is responsible for performing hybrid ARQ operations (e.g. generating HARQ ACK/NACKs for transmission via the PHY entity and for handling HARQ ACK/NACKs received via the PHY entity). The MAC entity is responsible for resource request operations (such as the triggering of scheduling requests (SRs)). The PHY entity transmits the HARQ ACK/NACKs and SRs, triggered by the MAC entity, onto a physical uplink control channel (PUCCH). The base station 5 (and LPNs 7) has similar complementary MAC and PHY entities.

Advantageously, and somewhat counter-intuitively given the requirement for LBT on such cells, each LAA SCell is provided with its own independent physical uplink control channel (PUCCH). In the case of a PUCCH in an LAA SCell, the PHY entity of the mobile device 3 performs CCA, in accordance with associated LBT requirements, before a HARQ ACK/NACK and/or SR can be transmitted.

The provision of such a PUCCH would generally be considered, by those skilled in the art, to be inappropriate because of the potential for the LBT requirement to block signalling on the PUCCH thereby preventing, for example, the LPN 7 from receiving HARQ feedback and/or scheduling requests.

Scheduling Request Handling

Efficient handling of scheduling requests (SRs) for the LAA SCells 11 is, for example, a particular challenge. This is because there is a relatively high possibility that SRs for the LAA SCells 11 will, in effect, be blocked by the LBT requirement, when CCA is performed, if the channel is found not to be clear. This contrasts with the situation in which SRs are transmitted in PCells or conventional SCells that use licensed spectrum in which SR failure is relatively rare.

Moreover, the possibility of SR configuration collision, in which the configured opportunity for sending an SR in the PCell clashes with the configured opportunity for sending an SR in the SCell, has a potentially greater impact for networks having LAA SCells than for networks having only cells that use licensed spectrum. For example, if the mobile device 3 decides to send the SR on the PUCCH of an LAA SCell that operates using spectrum that is often occupied then the LBT requirement will result in that SR being repeatedly blocked meaning that the UE has to wait significantly longer for uplink shared channel resources. However, transmitting the SR on the PUCCH of a PCell may require a higher transmission power than would be necessary if the SR were successfully transmitted on the PUCCH of an LAA SCell. Similarly, transmitting the SR on the PUCCH of a PCell may be undesirable because of poorer quality channel conditions and/or relatively high load (i.e. resource usage) in the PCell.

Notwithstanding the above challenges, as illustrated in FIG. 1a when the mobile device 3 requires communication resources to transmit data on the uplink shared channel (UL-SCH/PUSCH) in a particular cell 9, 11, the mobile device 3 will send, subject to LBT requirements being met, an SR to the corresponding base station 5 or LPN 7 to notify the radio network when the mobile device 3 wants to transmit data. These SRs are transmitted by the mobile device 3 on a physical uplink control channel (PUCCH) for the corresponding PCell (e.g. PUCCH group 1) or LAA SCell (e.g. PUCCH group 2 for SCell 11-1 and PUCCH group 3 for SCell 11-2). The mobile device 3 has a configured periodic timeslot (1, 2, 5, 10, 20, 40, and 80 ms) for transmitting the SRs which can be configured using radio resource control (RRC) signalling. The period configured for SRs sent in the PCell 9 are typically longer the period configured for SRs the SCells 7.

Advantageously, in this example, when the MAC entity of the mobile device 3 triggers transmission of an SR on one of the LAA SCells but the PHY entity is unable to transmit the SR, as a result of LBT requirements (i.e. because the channel is not clear) the PHY entity informs the MAC entity of the mobile device 3 of the LBT failure in SR transmission. The MAC entity therefore knows not to increment the SR transmission counter and does not treat the SR as pending. Instead, the MAC entity initiates a new SR transmission in the next available TTI. In essence, therefore, in the event of LBT blocking an SR on an LAA SCell this is treated differently to an SR that may have been prevented from reaching its destination by a radio failure.

In the event of a collision between the SR configuration for SRs on an LAA SCell 11 and the SR configuration for SRs on the PCell 9, the MAC entity of the mobile device 3 may select whether to send the SR transmission on either the PUCCH for the LAA SCell 11 or the PUCCH for the PCell 9. However, beneficially, the base station 5 is also able to configure the mobile device 3 to transmit an SR on a specific PUCCH group (PCell or SCell) in the event of SR configuration collision.

Advantageously, the mobile device 3 of this example is also configured to report, to the base station 5/LPN 7, a number of new parameters to facilitate improved SR handling in the case of LBT.

In relation to scheduling requests blocked by LBT the new parameters include a parameter indicating the number of SR transmissions blocked by LBT. In relation to scheduling configuration collisions the new reporting parameters include a parameter indicating the number of SR transmissions carried on each different PUCCH group (e.g. LAA SCell, conventional SCell or PCell) when, in the event of SR configuration collision, the mobile device 3 has selected one of the conflicting PUCCH groups to use.

The base station 5 and/or LPN 7 are beneficially configured to update SR configuration based on this reported information for example to configure the mobile device 3 such that SR transmission takes place on the PCell PUCCH or a particular LAA SCell PUCCH (which may be different to the current LAA SCell PUCCH).

HARQ ACK/NACK and DTX Handling

Another challenge, for implementing a PUCCH for an LAA SCell is the potential impact of LBT on the transmission of hybrid automatic repeat request (HARQ) acknowledgments (ACKs) and negative acknowledgments (NACKs) for LAA SCells.

Conventionally, HARQ ACK/NACKs are sent by a UE on a PUCCH in response to a scheduling command sent, using the PDCCH, by the base station and the subsequent transmission of data to the UE on the PDSCH. The HARQ ACKs or NACKs respectively indicate that data was received successfully or failed. Accordingly, a base station (or other communication node operating a cell) respectively moves to a new transmission, or performs a retransmission, after receiving an HARQ ACK or an HARQ NACK from UE. On receipt of HARQ NACKs the base station will continue to perform data retransmission to the UE until it reaches a preconfigured maximum number of retransmissions allowed before data transmission is finally dropped. When retransmitting, if the base station knows that its earlier transmission has been received but incorrectly decoded (because it has received a NACK), then it may send only part of the original data transmission (referred to as a 'Redundancy Version (RV)') and this redundancy version may change between retransmissions. The UE can buffer the original data as received (albeit containing errors) and attempt to recombine it incrementally with each subsequent redundancy version in an attempt to form a correct version of the original transmission (e.g. using incremental redundancy HARQ). When a correct version of the received data has been formed an ACK can be sent. When transmitting new data, the base station includes a 'New Data Indicator (NDI)' (single bit) that is set to indicate the transmission of new data (the NDI is not set for retransmissions).

Hybrid ARQs ACK/NACKs are sent on the PUCCH using an appropriate format. In the case of carrier aggregation with two serving cells the so called PUCCH format 1b with channel selection may be used as defined in 3GPP Technical Standard (TS) 36.213 v12.6.0. PUCCH format 1b allows the delivery of a two bit HARQ ACK/NACK indicator (b(0),b(1)) using a PUCCH resource selected from up to four different PUCCH resources albeit that in this example only two of the possible PUCCH resources are used (parameter 'A' equals 2 in TS36.213). The base station interprets the combination of the selected PUCCH resource used by the UE, and the pattern of two bits transmitted, as indicated in Table 1 below:

TABLE 1

Interpretation of HARQ ACK/NACK on PUCCH format 1b
($1^{st}$ column corresponds HARQ indication for $1^{st}$ cell; $2^{nd}$ column corresponds HARQ indication for $2^{nd}$ cell; $3^{rd}$ column corresponds to selected PUCCH resource; and $4^{th}$ column corresponds to transmitted bit pattern)

| HARQ-ACK(0) | HARQ-ACK(1) | $n_{PUCCH}^{(1)}$ | b(0)b(1) |
|---|---|---|---|
| ACK | ACK | $n_{PUCCH,1}^{(1)}$ | 1, 1 |
| ACK | NACK/DTX | $n_{PUCCH,0}^{(1)}$ | 1, 1 |
| NACK/DTX | ACK | $n_{PUCCH,1}^{(1)}$ | 0, 0 |
| NACK | NACK/DTX | $n_{PUCCH,0}^{(1)}$ | 0, 0 |
| DTX | NACK/DTX | No Transmission | |

In Table 1, the references to 'DTX' refer to situations where the UE has failed to receive a downlink scheduling command. The references to 'NACK/DTX' refer to situations where it is ambiguous whether the UE has received a downlink scheduling command in the 2nd cell but failed to properly decode the associated PDSCH data, or the UE has completely failed to receive a downlink scheduling command.

Accordingly, referring to the bottom row of Table 1, if the base station has signalled a downlink scheduling command in the $1^{st}$ cell the absence of any transmission on the PUCCH format 1b is interpreted, by the base station, as arising from the UE having failed to receive a downlink scheduling command in the $1^{st}$ cell resulting in no explicit HARQ ACK/NACK being sent (DTX). If the base station has signalled a downlink scheduling command in the $2^{nd}$ cell an absence of any transmission on the PUCCH format 1b is ambiguous because it may have resulted from the UE failing to receive a downlink scheduling command in the $2^{nd}$ cell or it may have resulted from the UE having received a downlink scheduling command in the $2^{nd}$ cell but failed to properly decode the associated PDSCH data (NACK/DTX).

It can be seen, therefore, that additional ambiguity for feedback relating to two LAA SCells because the base station has no way of determining whether: an absence of a HARQ transmission arises from the LBT requirement preventing such transmission; or the absence of a HARQ transmission has arisen as a result of the UE having failed to receive a downlink scheduling command/failed to decode a PDSCH transmission (i.e. DTX, DTX/NACK in Table 1).

As illustrated in FIG. 1b, in the telecommunication network 100, the mobile device 3 is configured to send, via a PUCCH of an LAA SCell 11, HARQ ACK/NACK feedback in a similar manner to HARQ ACK/NACK feedback on a PUCCH that is unaffected by LBT. Thus, when the mobile device 3 receives a downlink resource allocation, the mobile device 3 will attempt to send an associated HARQ ACK, on the PUCCH of an LAA SCell, to indicate successful receipt and decoding of the PDCCH/PDSCH transmission. Similarly, the mobile device 3 will try to send a HARQ NACK on the PUCCH of the LAA SCell if decoding is unsuccessful. The HARQ feedback transmissions are subject to LBT requirements and so when the feedback is sent on the PUCCH for an LAA SCell the transmissions may be blocked by the LBT requirement when channel is not clear.

Advantageously, unlike conventional systems, for a pair of serving LAA SCells the mobile device 3 is configured to always explicitly signal an explicit HARQ NACK, in the event of a decoding failure of the PDSCH, regardless of which of the two LAA SCells 11 the decoding failure relates to (i.e. NACK/DTX ambiguity does not occur). Accordingly, if the LPN 7 does not receive any HARQ ACK/NACK transmission following downlink scheduling, this will not be interpreted as a NACK/DTX situation. Instead, the lack of transmission will be interpreted as resulting either from the mobile device 3 failing to receive the downlink scheduling command or the PUCCH of the SCell being blocked by the LBT requirement (DTX/LBT).

To facilitate discrimination between the DTX situation and LBT blocking, the mobile device 3 of this example is also configured to report, to the base station 5/LPN 7, a number of new parameters to facilitate improved HARQ ACK/NACK and DTX handling in the case of LBT.

The parameters include one or more of: a parameter indicating a number of HARQ NACK transmissions blocked by LBT; a parameter indicating a number of HARQ ACK transmissions blocked by LBT; and a parameter indicating a number of successfully received UE DL scheduling commands. Similarly, the parameters may include a parameter indicating the total number of HARQ ACKs and/or NACKs transmitted.

The base station 5/LPN 7 can determine, from this information when reported, the number of missed DL scheduling commands because it knows the total number of such commands sent to the UE.

Accordingly, based on the reported parameters for HARQ ACK/NACK transmissions on a PUCCH group for an LAA SCell, the base station 5 is beneficially able to distinguish, albeit after the fact, between HARQ ACK/NACK blocked by LBT, and no UE transmission because of UE missing scheduling command (DTX), on a particular PUCCH for an LAA SCell.

<Mobile Device>

FIG. 2 is a block diagram illustrating the main components of the mobile device 3 shown in FIGS. 1a and 1b. As shown, the mobile device 3 has a transceiver circuit 31 that is operable to transmit signals to and to receive signals from a base station 5 via one or more antenna 33. The mobile device 3 has a controller 37 to control the operation of the mobile device 3. The controller 37 is associated with a memory 39 and is coupled to the transceiver circuit 31. Although not necessarily shown in FIG. 2, the mobile device 3 will of course have all the usual functionality of a conventional mobile device 3 (such as a user interface 35) and this may be provided by any one or any combination of hardware, software and firmware, as appropriate. Software may be pre-installed in the memory 39 and/or may be downloaded via the telecommunication network or from a removable data storage device (RMD), for example.

The controller 37 controls overall operation of the mobile device 3 by, in this example, program instructions or software instructions stored within the memory 39. As shown, these software instructions include, among other things, an operating system 41, a communications control module 43, a scheduling request module 44, a HARQ feedback module 45, a reporting module 47 and an LBT module 49.

The communications control module 43 controls the communication between the mobile device 3 and the base station 5. The communications control module 43 also controls the separate flows of control data and user data (for uplink and downlink) that are to be transmitted to the base station 5 and other LPNS 7.

The scheduling request module 44 manages the generation of SRs (by the MAC entity) and their transmission (by the PHY entity) to the base station 5 and LPNs 7 on the corresponding PUCCH. The scheduling request module 44 also manages the configuration of SRs at the mobile device 3 (e.g. responsive to an SR configuration request from a base station/LPN) and selection a particular PUCCH group (PCell or LAA SCell) in the event of SR configuration.

The HARQ feedback module 45 manages the generation of HARQ ACK/NACKs (by the MAC entity) and their transmission (by the PHY entity) to the base station 5 and LPNs 7 on the corresponding PUCCH. The HARQ feedback module 45 also manages any HARQ feedback received from the base station/LPN.

The reporting module 47 manages the logging of information relating to SRs and/or HARQ feedback. In relation to SR handling, this information may include, for example, the number of SR transmissions blocked by LBT and/or the respective number of SR transmissions carried on each different PUCCH group. In relation to HARQ feedback handling, this information may include, for example, the number of HARQ NACK transmissions blocked by LBT, the number of HARQ ACK transmissions blocked by LBT, the number of missed UE DL scheduling commands, and/or the number of HARQ ACKs and/or NACKs transmitted. The reporting module 47 also manages the generation of reports to report the logged information and the configuration of SRs and/or HARQ feedback reporting (e.g. responsive to an associated configuration request received from a base station/LPN).

The LBT module 49 manages the performance of clear channel assessment (CCA)/channel sensing (CS) for LAA cells such as the LAA SCells 11 necessitated by LBT requirements. The LBT module 49 also manages the blocking of transmissions, including PUCCH transmissions, in the event that the communication channel is not clear.

<Base Station/LPN>

FIG. 3 is a block diagram illustrating the main components of communication apparatus, for operating a cell, such as the base station 5 (PCell 9) or LPN 7 (SCell 11) shown in FIGS. 1a and 1b.

As shown, the base station 5/LPN 7 has a transceiver circuit 51 for transmitting signals to and for receiving signals from the mobile devices 3 via one or more antenna 53, at least one (but typically a plurality) of network interfaces 54 for transmitting signals to and for receiving signals from other network entities such as, for example, other cell operating apparatus (e.g. a base station via an X2 interface) and core network entities (e.g. a mobility management entity via an S1 interface). The base station 5/LPN 7 has a controller 57 to control the operation of the base station 5/LPN 7. The controller 57 is associated with a memory 59. Although not necessarily shown in FIG. 3, the base station 5/LPN 7 will of course have all the usual functionality of a cellular telephone network base station/LPN and this may be provided by any one or any combination of hardware, software and firmware, as appropriate. Software may be pre-installed in the memory 59 and/or may be downloaded via the communication network 1 or from a removable data storage device (RMD), for example.

The controller 57 is configured to control the overall operation of the base station 5/LPN 7 by, in this example, program instructions or software instructions stored within the memory 59. As shown, these software instructions include, among other things, an operating system 61, a communications control module 63, a scheduling request module 64, a HARQ feedback module 65, a reporting management module 67 and, in the case of communication apparatus operating a cell in an unlicensed band (e.g. an LPN 7 operating an LAA SCell 11) an LBT module 69.

The communications control module 63 controls the communication between the base station 5/LPN 7 and the mobile device 3 and other network entities via the network interface 54. The communications control module 63 also controls the separate flows of uplink/downlink user traffic and control data received from and transmitted to the mobile device 3.

The scheduling request module 64 manages the generation of SRs (by the MAC entity) and their transmission (by the PHY entity) to the base station 5 and LPNs 7 on the corresponding PUCCH. The scheduling request module 64 also manages the configuration of SRs at the mobile device 3 (e.g. responsive to an SR configuration request from a base station/LPN) and selection a particular PUCCH group (PCell or LAA SCell) in the event of SR configuration.

The HARQ feedback module 65 manages the receipt of HARQ ACK/NACKs from the mobile device 3 on the corresponding PUCCH. The HARQ feedback module 65 also manages the generation of any HARQ ACK/NACKs (by the MAC entity) and their transmission (by the PHY entity) to the mobile device 3.

The reporting management module 67 manages the receipt and interpretation of information relating to SRs and/or HARQ feedback reported by the mobile device 3. The reporting management module 67 also manages the configuration and reconfiguration of SR reporting (e.g. to configure a mobile device 3 to use a particular PUCCH group (PCell of SCell) in the event of SR configuration collision).

The LBT module 69, where present, manages the performance of clear channel assessment (CCA)/channel sensing (CS) for LAA cells such as the LAA SCells 11 necessitated by LBT requirements. The LBT module 69 also manages the blocking of transmissions in the downlink in the event that the communication channel is not clear.

<SR Handling>

As explained above scheduling requests (SRs) are used by a mobile device 3 to notify the radio network when it wants to transmit data. The handling of SRs will now be described in more detail with reference to FIGS. 4 to 6.

FIG. 4 illustrates, in simplified form, a process for requesting and receiving a grant of uplink shared channel resources on a PCell and the potential impact of LBT in an LAA SCell.

As shown generally at 400, for cells using licensed spectrum such as the PCell 9, the mobile device 3 sends, in a preconfigured periodic timeslot, an SR to the base station 5. The SR, being a single bit, is insufficient to inform a scheduler of the amount of data that the device needs to transfer. Accordingly, a small "uplink grant" is initially sent to the requesting mobile device 3 that is just large enough to communicate the size of the pending buffered data. Once the mobile device 3 receives its first uplink grant the mobile device 3 sends a Buffer Status Report (BSR) indicating the amount of application data pending in its upload buffers. After receipt of the BSR message, the necessary uplink resources are allocated in the uplink shared channel for the mobile device 3 and an associated uplink grant sent to the mobile device 3.

In the absence of LBT blocking effects, SRs are transmitted by the mobile device 3 on a PUCCH of the LAA Cell 11 to the corresponding LPN 7, and uplink shared channel resources are granted in a similar manner to the way illustrated for the base station 5 in FIG. 4 generally at 400. However, as illustrated generally at 402, in the event of a negative clear channel assessment the LBT requirement effectively blocks SRs thereby preventing grant of uplink resources.

Whilst the PCell operates on a licensed band and is not, therefore, subject to LBT blocking there may be other reasons, such as radio link failure, why a particular SR does not result in an (immediate) uplink grant. To manage this, when an SR is triggered in the PCell, it is considered pending until it is cancelled. A scheduling request transmission counter ('SR_COUNTER') is used to track the number of transmitted SRs. If a maximum number of transmitted SRs ('dsr-TransMax') is reached (SR_COUNTER>=dsr-TransMax) and the mobile device 3 has not been allocated any radio resources for uplink transmission, then the mobile device 3 initiates a random access procedure. If the random access procedure is unsuccessful, then the mobile device 3 moves into an idle (RRC_IDLE) state. After each SR is transmitted a scheduling request prohibit timer ('sr-Prohibit-Timer') is started which runs for a predetermined time period. While the SR prohibit timer is running further SRs transmissions are effectively prevented.

In more detail, for the PCell, any pending SR is cancelled and the SR prohibit timer is stopped when the MAC entity of the mobile device 3 assembles a MAC protocol data unit (PDU) and this PDU includes a buffer status report (BSR) which contains buffer status up to (and including) the last event that triggered a (BSR).

For the PCell, if an SR is triggered, and there is no other SR pending, the MAC entity in the mobile device 3 sets the SR transmission counter to 0. As long as one SR is pending, however, and no uplink shared channel resources are available for the current transmission time interval (TTI) then, for each TTI, the MAC entity of the mobile device 3 first determines whether there is a valid PUCCH resource for an SR in the TTI. If there is no valid PUCCH resource for an SR in the TTI, a random access procedure is performed on the PCell and any pending SRs are cancelled.

Assuming that: there is a valid PUCCH resource for an SR in the TTI; the TTI is not part of a measurement gap; and the SR prohibit timer is not running; then, as long as the maximum number of transmitted SRs has not been reached, the SR transmission counter is incremented and the MAC entity instructs the PHY layer to signal the SR on the PUCCH of the PCell. The SR prohibit timer is then started.

Otherwise, if the maximum number of transmitted SRs has been reached, the radio resource control (RRC) entity is notified to release PUCCH/SRs for all serving cells, any configured downlink assignments and uplink grants are cleared, the random access procedure is initiated on the PCell, and all pending SRs are cancelled.

FIG. 5 illustrates, in simplified form, a process for managing SRs sent in the LAA SCell 7 in the event of the LBT requirement effectively blocking the PUCCH in an LAA SCell 7.

As seen in FIG. 5, in this example, when the MAC entity of the mobile device 3 has data to transmit (at S500) on one of the LAA SCells and UE does not have radio resource to transmit BSR, the MAC entity in the mobile device 3 starts the SR transmission procedure (S502).

For each TTI, when there are no uplink shared channel resources available for the current transmission time interval (TTI) (S504) then the MAC entity of the mobile device 3 checks that there is a valid PUCCH resource for an SR in the TTI. If there are no valid PUCCH resources for an SR in the TTI, a random access procedure is performed and any pending SRs are cancelled (not shown).

Assuming that there is a valid PUCCH resource for an SR in the TTI, the TTI is not part of a measurement gap, and the SR prohibit timer is not running (S506) then (as long as the maximum number of transmitted SRs has not been reached (SR_COUNTER<dsr-TransMax)), the MAC entity instructs the PHY layer to signal the SR on the PUCCH of the LAA SCell (S510). However, in this example, at this stage the SR transmission counter is not changed.

If the PHY entity is unable to transmit the SR (S512), as a result of LBT requirements (i.e. because the channel is not clear) the PHY entity informs the MAC entity of the mobile device 3 of the LBT failure in SR transmission (S514). The MAC entity therefore knows not to increment the SR transmission counter and does not treat the SR as pending (S516). The LBT blocking of the SR transmission is logged (as described elsewhere) and the MAC entity attempts to initiate a new SR transmission in the next available TTI. If the SR is transmitted successfully then the SR transmission counter is incremented as usual and the procedure is substantially the same as for the PCell.

In essence, therefore, in the event of LBT blocking an SR on an LAA SCell this is treated differently to an SR that may have been prevented from reaching its destination by a radio failure.

It will be appreciated that, whilst it is particularly beneficial to be able to treat LBT blocking of an SR on an LAA SCell differently to SRs being prevented from reaching their destination by a radio failure, a simpler process may be preferred in which an SR blocked by LBT is treated in a similar manner to SRs being blocked by a radio failure. FIG. 6 illustrates, in simplified form, such a process for managing SRs sent in the LAA SCell 7 in the event of the LBT requirement effectively blocking the PUCCH in an LAA SCell 7.

As seen in FIG. 6, in this example, when the MAC entity of the mobile device 3 has data to transmit (at S600) on one of the LAA SCells and there is no other SR pending, the MAC entity in the mobile device 3 sets the SR transmission counter to 0 at S602. If at least one SR is pending then the counter is not set to zero.

For each TTI, when there are no uplink shared channel resources available for the current transmission time interval (TTI) (S604) then the MAC entity of the mobile device 3 checks that there is a valid PUCCH resource for an SR in the TTI. If there are no valid PUCCH resources for an SR in the TTI, a random access procedure is performed and any pending SRs are cancelled (not shown).

Assuming that there is a valid PUCCH resource for an SR in the TTI, the TTI is not part of a measurement gap, and the SR prohibit timer is not running (S606) then the SR transmission counter is checked (S608).

If the maximum number of transmitted SRs has not been reached (SR_COUNTER<dsr-TransMax) the MAC entity instructs the PHY layer to signal the SR on the PUCCH of the LAA SCell (S610) and the SR transmission counter is incremented (S622). The SR is treated as pending and, in the next TTI, when no UL shared resources have been allocated SR transmission will re-attempt (S614) (assuming the maximum number of transmitted SRs has not been reached—(SR_COUNTER<dsr-TransMax).

In this case, therefore, when the SR on an LAA SCell is blocked by LBT the MAC entity still increments the SR transmission counter by 1 and, while the SR transmission counter remains less than maximum number of transmitted SRs (SR_COUNTER<dsr-TransMax), the MAC entity of the mobile device continues to attempt to retransmit the SRs. When the maximum number of transmitted SRs is reached the mobile communication device performs a random access procedure.

Otherwise, if the maximum number of transmitted SRs has been reached (SR_COUNTER>=dsr-TransMax), the radio resource control (RRC) entity is notified to release PUCCH/SRs for all serving cells (S624), any configured downlink assignments and uplink grants are cleared (S626), the random access procedure is initiated on the LAA-SCell, and all pending SRs are cancelled (S628).

<SR Configuration>

As explained above, the base station 5 is also able to configure and reconfigure the mobile device 3 to transmit an SR on a specific PUCCH group (PCell or SCell), for example, in the event of SR configuration collision.

FIG. 7 illustrates one possible process for SR configuration. As seen generally at S700 in FIG. 7, in this example, configuration is achieved by means of a new parameter for explicitly indicating which PUCCH group to use (e.g. sr_PUCCH-GroupIndex IE) included in a scheduling request configuration information element ('SchedulingRequestConfig' IE) provided via radio resource control (RRC) signalling (e.g. in a RRC Connection Reconfiguration message) (S704). The UE can then configure/reconfigure SR transmission in event of SR configuration collision (S706) accordingly.

In this manner the mobile device 3 may be configured to transmit the SR in the next available PUCCH group on an LAA SCell or to transmit the SR in the next available PUCCH group on PCell. If the new parameter is not present then it may be left up to the mobile device 3 to select whether to send the SR transmission on either the PUCCH for the LAA SCell 11 or the PUCCH for the PCell 9. The handling of SRs will now be described in more detail with reference to FIGS. 4 to 6.

Table 2 illustrates the way in which the SchedulingRequestConfig information element may modified to incorporate the sr_PUCCH-GroupIndex (or similar) information element.

TABLE 2

SchedulingRequestConfig information element
-- ASN1START
SchedulingRequestConfig ::=          CHOICE {
    release                                      NULL,
    setup                                        SEQUENCE {
        sr-PUCCH-ResourceIndex           INTEGER
(0..2047),
        sr-ConfigIndex                       INTEGER
(0..157),
        dsr-TransMax
    ENUMERATED {
    n4, n8, n16, n32, n64, spare3, spare2, spare1},
sr-PUCCH-GroupIndex                      INTEGER (0..3)}
}
SchedulingRequestConfig-v1020 ::=   SEQUENCE {
    sr-PUCCH-ResourceIndexP1-r10         INTEGER (0..2047)
    OPTIONAL            -- Need OR
}
                                     -- ASN1STOP
SchedulingRequestConfig field descriptions
...
sr-PUCCH-GroupIndex parameter for SR transmission. The parameter value between 0 and 3 corresponds to SR transmission on PUCCH group 1, PUCCH group 2, and so on.
...

<HARQ ACK/NACK Feedback>

FIG. 8 illustrates a possible process handling HARQ Feedback on an LAA SCell. As seen in FIG. 8, when a downlink scheduling command allocating PDSCH resources is provided to the mobile device 3 via the PDCCH (at S800) and an associated data communication provided to the mobile device 3, and the mobile device 3 receives the command and either can or cannot successfully decode the PDSCH signalling, the MAC entity of the mobile device 3 will trigger corresponding ACK or NACK feedback as necessary (at S810). If the ACK or NACK feedback is blocked, at the PHY layer of the mobile device 3, by the LBT requirement this is notified to the MAC entity (at S814) for logging purposes (at S818). The LPN 7 of the LAA SCell 11, having not received any explicit HARQ feedback assumes that the failure of transmission was either due to DTX or LBT (at S822) and logs this for later resolution based on the logged HARQ related LBT parameters when they are reported later (at S824).

<Enhanced Reporting>

As explained above, the mobile device 3 of this example is configured to report, to the base station 5/LPN7, a number of new parameters to facilitate improved SR and/or HARQ ACK/NACK handling in the case of LBT.

FIG. 9 illustrates possible processes for SR configuration. As seen generally at S900 in FIG. 9, in one example, the new parameters logged by the mobile device 3 (at S918) are advantageously reported using a so called immediate Minimisation of Drive Tests (MDT) report sent to the base station 5/LPN 7 (at S906). These MDT reports are typically configured by means of a measurement configuration message (e.g. at S904).

As seen generally at S902 in FIG. 9, in another example, the parameters are using a Radio Link Failure (RLF) report. In this example the new parameters logged by the mobile device 3 (at S918) may be sent as part of a UE Information Response message (at S910) sent responsive to a UE Information Request message sent from the base station 5/LPN 7 (at S910).

The reporting may be configured in any of a number of ways for example as a periodic report (e.g. as shown, by way of example, for the MDT reporting) with periodicity configured by the base station/LPN (e.g., 120 ms, and so on) or on an event triggered basis.

A periodic report may, for example, indicate for the reporting period (or possibly another time period): how many SR transmissions were blocked by LBT over total attempted SR transmissions; on which PUCCH group an SR transmission was attempted; how many SR transmission attempts on a particular PUCCH group of an LAA SCell were blocked by LBT; and/or a number of HARQ ACK/NACK transmissions blocked by LBT possibly in conjunction with the total number of HARQ ACK/NACK transmitted in the period.

The reporting may be configured as a one shot report, sent responsive to a request from the base station/LPN, for example to indicate: the number of SR transmissions blocked by LBT (the mobile device 3 can continue to log SR transmission failure due to LBT); on which PUCCH group an SR transmission was attempted (the mobile device 3 will continue to log SR transmission attempts blocked by LBT in association with information identifying the PUCCH group of that LAA SCell); and/or number of HARQ ACK/NACK transmissions blocked by LBT possibly in conjunction with the total number of HARQ ACK/NACK transmitted. These parameters may be reported for a time period running since the last request was made, or from some other time point (e.g. when the mobile device began communicating in the cell).

<Modifications and Alternatives>

Detailed exemplary embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above exemplary embodiments, the mobile devices are cellular telephones. It will be appreciated that the above exemplary embodiments could be implemented using devices other than mobile telephones such as, for example, personal digital assistants, laptop computers, web browsers, etc. The above exemplary embodiments are applicable to non-mobile or generally stationary user equipment as well.

It will be appreciated that whilst the ability of the base station to configure the mobile device to transmit an SR on a specific PUCCH group provides benefits in terms of flexibility. The mobile device may be set up to prioritise one PUCCH group (PCell or SCell) over the other(s).

It will be appreciated that there are benefits even if only one, or a subset, of the new reporting parameters is reported. It will also be appreciated that one or a subset of the parameters may be reported using an MDT report and one or a subset of the parameters may be reported using an RLF report.

It will be appreciated that the macro base station may receive (either directly, or indirectly via an LPN or other node) a report of the logged SR/HARQ parameters and this base station may analyse and interpret these parameters (e.g. to determine a reason for the lack of HARQ feedback transmission and/or to determine which PUCCH to configure for SR transmission).

It will be appreciated that the SR transmission for an LAA SCell operating on a licensed band may be configured to use another SCell SR counter parameter ('sCellSrCounter') configured for use, by the UE, in the SR procedure for LAA SCells (e.g. in the procedure of FIG. 6). In this case, while the maximum number of transmitted SRs has not been reached, when the SCell SR counter parameter is configured, and the SR transmission counter is also less than the value of the configured SCell SR counter parameter, then the PHY layer may be instructed to signal the SR on the PUCCH of the LAA SCell when the PUCCH resource is associated with an LAA SCell (e.g. when the SR transmission counter is incremented as S611). If the SCell SR counter parameter is not configured, or the SR transmission counter is not less than the SCell SR counter parameter, then the normal procedure for the PCell may be followed.

It will be appreciated that in the process of FIG. 5 if, following the triggering of the SR by the MAC entity at S510, the PHY entity is able to transmit the SR (i.e. the channel is clear) then the PHY entity may instruct the MAC to increment SR transmission counter (i.e. SR transmission is not blocked by LBT), or send a SR transmission success indication, and the MAC entity may increment the SR transmission counter in response to such an instruction/success indication. Alternatively, the MAC entity may increment the SR transmission counter in the absence of the failure indication sent at S514 (e.g. if the MAC entity does not receive such a failure indication in a predetermined time period or before the expiry of a timer) without the need for an explicit instruction/success indication.

Moreover, whilst explicit feedback of LBT blocking is particularly beneficial, it will be appreciated that there may be no explicit feedback from the PHY entity in the event of LBT blocking of the SR at S512. The absence of positive feedback in the form of a success indication or an explicit instruction to increment the SR transmission counter (e.g. within a predetermined time period or before the expiry of a timer) may implicitly indicate LBT blocking of the SR at S512.

The at least one control signal that said controller is adapted to generate may comprise at least one scheduling request (SR).

The communication device may comprise a medium access control layer (MAC) entity and a physical layer (PHY) entity and said controller may be adapted: to cause said MAC entity to generate said SR and to trigger said PHY entity to attempt to transmit said SR using said transceiver; and to cause said PHY entity to perform said CCA.

The controller may be adapted to cause said PHY entity to provide feedback to said MAC entity to indicate at least one of: when said CCA indicates that said channel is not clear, blocking of transmission of said at least one SR on said PUCCH; and when said CCA indicates that said channel is clear, successful transmission of said at least one SR on said PUCCH.

The controller may be adapted to control said MAC entity to determine whether or not to increment an SR transmission counter based on said feedback. The controller may be adapted to control said MAC entity to increment an SR transmission counter regardless of whether said CCA indicates that said channel is not clear or said CCA indicates that said channel is clear.

The communication device may be configured to communicate with each of a plurality of different communication apparatus', including said communication apparatus that operates said LAA cell, via a different respective PUCCH; wherein said controller may be adapted to trigger transmission of SRs on each PUCCH in accordance with a timing configured by respective SR configuration information for that PUCCH; wherein said transceiver may be adapted to receive information from at least one of said different communication apparatus' for configuring said communication device to transmit an SR on a first of said different PUCCHs, in preference to a second of said different PUCCHs, when said timing configured by the SR configuration information for the first and the second different PUCCH may coincide.

The at least one control signal that said controller is adapted to generate may comprise at least one Hybrid Automatic Repeat Request (HARQ) feedback signal. In this case, the transceiver may be adapted to receive (e.g. from said communication apparatus that operates said LAA cell or a different communication apparatus that operates a different cell) scheduling information for scheduling downlink data transmissions to said communication device in at least one of said LAA cell and a different cell; wherein said controller may be configured to generate HARQ feedback for said scheduling information and downlink data transmission using a PUCCH format (e.g. PUCCH format 1b) in which a single HARQ indicator is generated that represents HARQ feedback for both said LAA cell and a different cell; wherein, in the event of a decoding failure of said downlink data transmission in either one of said LAA cell or said different cell, said HARQ indicator may represent an explicit HARQ negative acknowledgement (NACK) for that cell, regardless of which of said LAA cell and said different cell the decoding failure relates to, and regardless of the type of HARQ feedback HARQ indicator represents in relation to the other of said LAA cell and said different cell.

The controller may be operable to acquire at least one parameter related to said at least one control signal and to generate a report (e.g. an (immediate) Minimisation of Drive Tests (MDT) and/or Radio Link Failure (RLF) report) for reporting said at least one parameter. In this case, the at least one parameter may comprise at least one scheduling request (SR) related parameter. For example, the at least one SR related parameter may comprise at least one of: a parameter indicating a quantity of SR transmissions blocked as a result of said CCA (e.g. as a result of a listen-before-talk, LBT, requirement); a parameter indicating a quantity of SR transmissions on said PUCCH; and a parameter indicating a respective quantity of SR transmissions carried on each of a plurality of different PUCCHs (e.g. when an SR configuration collision has occurred between respective SR configurations for each of, or each of a subset of, said plurality of PUCCHs).

The at least one parameter may comprise at least one Hybrid Automatic Repeat Request (HARQ) feedback parameter. In this case, the at least one parameter comprising at least one HARQ feedback parameter may comprise at least one of: a parameter indicating a quantity of HARQ Negative Acknowledgement (NACK) transmissions blocked as a result of said CCA (e.g. as a result of a listen-before-talk, LBT, requirement); a parameter indicating a number of HARQ Acknowledgement (ACK) transmissions blocked as a result of said CCA (e.g. as a result of a listen-before-talk. LBT, requirement); a parameter indicating a number of successfully received user equipment downlink (UE DL) scheduling commands; and a parameter indicating the total number of HARQ ACKs and/or NACKs transmitted on said PUCCH (optionally per PUCCH where there are a plurality of PUCCHs).

The LAA cell may be operated as an LAA secondary cell (LAA SCell).

In the above exemplary embodiments, a number of software modules were described. As those skilled in the art will appreciate, the software modules may be provided in compiled or un-compiled form and may be supplied to the UE, LPN or base station as a signal over a computer network, or on a recording medium. Further, the functionality performed by part or all of this software may be performed using one or more dedicated hardware circuits.

Various other modifications will be apparent to those skilled in the art and will not be described in further detail here.

The invention claimed is:

1. A communication device for a communication system, the communication device comprising:
   a transceiver adapted to communicate with communication apparatus that operates a cell within which the communication device is located, wherein the cell is operated as a licensed assisted access, LAA, cell and has an associated physical uplink control channel, PUCCH, wherein the LAA cell is operated as LAA secondary cell, LAA SCell that is subjected to a listen-before-talk (LBT) requirement; and
   a controller adapted:
      to generate at least one uplink control signal for transmitting to said communication apparatus;
      to perform a clear channel assessment, CCA, in accordance with an associated LBT requirement, on said PUCCH before said at least one uplink control signal is transmitted; and
      to block transmission of said at least one uplink control signal on said PUCCH when said CCA indicates that a channel is not clear;
   wherein the transceiver is further adapted, when said controller has not blocked said transmission of said at least one uplink control signal, to transmit said at least one uplink control signal to said communication apparatus in said PUCCH, and
   wherein the transceiver is further configured to transmit, to the communication apparatus, a number of uplink control signals blocked by the LBT.

2. A communication device as claimed in claim 1 wherein said at least one uplink control signal that said controller is adapted to generate comprises at least one scheduling request, SR.

3. A communication device as claimed in claim 2 wherein said communication device comprises a medium access control layer, MAC, entity and a physical layer, PHY, entity and wherein said controller is adapted: to cause said MAC entity to generate said SR and to trigger said PHY entity to attempt to transmit said SR using said transceiver; and
   to cause said PHY entity to perform said CCA.

4. A communication device as claimed in claim 3 wherein said controller is adapted to cause said PHY entity to provide feedback to said MAC entity to indicate at least one of: when said CCA indicates that said channel is not clear, blocking of transmission of said at least one SR on said PUCCH; and when said CCA indicates that said channel is clear, successful transmission of said at least one SR on said PUCCH.

5. A communication device as claimed in claim 4 wherein said controller is adapted to control said MAC entity to determine whether or not to increment an SR transmission counter based on said feedback.

6. A communication device as claimed in claim 3 wherein said controller is adapted to control said MAC entity to increment an SR transmission counter regardless of whether said CCA indicates that said channel is not clear or said CCA indicates that said channel is clear.

7. A communication device as claimed in claim 2 wherein said communication device is configured to communicate with each of a plurality of different communication apparatus', including said communication apparatus that operates said LAA cell, via a different respective PUCCH; wherein said controller is adapted to trigger transmission of SRs on each PUCCH in accordance with a timing configured by respective SR configuration information for that PUCCH; wherein said transceiver is adapted to receive information from at least one of said different communication apparatus' for configuring said communication device to transmit an SR on a first of said different PUCCHs, in preference to a second of said different PUCCHs, when said timing configured by the SR configuration information for the first and the second different PUCCH coincides.

8. A communication device as claimed in claim 1 wherein said at least one uplink control signal that said controller is adapted to generate comprises at least one Hybrid Automatic Repeat Request, HARQ, feedback signal.

9. A communication device as claimed in claim 8 wherein said transceiver is adapted to receive scheduling information for scheduling downlink data transmissions to said communication device in at least one of said LAA cell and a different cell;
wherein said controller is configured to generate HARQ feedback for said scheduling information and downlink data transmission using a PUCCH format (e.g. PUCCH format 1b) in which a single HARQ indicator is generated that represents HARQ feedback for both said LAA cell and a different cell; wherein, in the event of a decoding failure of said downlink data transmission in either one of said LAA cell or said different cell, said single HARQ indicator represents an explicit HARQ negative acknowledgement, NACK, for that cell, regardless of which of said LAA cell and said different cell the decoding failure relates to, and regardless of the type of HARQ feedback HARQ indicator represents in relation to the other of said LAA cell and said different cell.

10. A communication device as claimed in claim 1 wherein said controller is operable to acquire at least one parameter related to said at least one control signal and to generate a report (e.g. an (immediate) Minimisation of Drive Tests, MDT, and/or Radio Link Failure, RLF, report) for reporting said at least one parameter.

11. A communication device as claimed in claim 10 wherein said at least one parameter comprises at least one scheduling request, SR, related parameter.

12. A communication device as claimed in claim 11 wherein said at least one SR related parameter comprises at least one of: a parameter indicating a quantity of SR transmissions blocked as a result of the (LBT) requirement; a parameter indicating a quantity of SR transmissions on said PUCCH; and a parameter indicating a respective quantity of SR transmissions carried on each of a plurality of different PUCCHs (e.g. when an SR configuration collision has occurred between respective SR configurations for each of, or each of a subset of, said plurality of PUCCHs).

13. A communication device as claimed in claim 10 wherein said at least one parameter comprises at least one Hybrid Automatic Repeat Request, HARQ, feedback parameter.

14. A communication device as claimed in claim 13 wherein said at least one parameter comprising at least one HARQ feedback parameter comprises at least one of: a parameter indicating a quantity of HARQ Negative Acknowledgement, NACK, transmissions blocked as a result of the LBT requirement; a parameter indicating a number of HARQ Acknowledgement, ACK, transmissions blocked as a result of the LBT requirement; a parameter indicating a number of successfully received user equipment downlink, UE DL, scheduling commands; and a parameter indicating the total number of HARQ ACKs and/or NACKs transmitted on said PUCCH (optionally per PUCCH where there are a plurality of PUCCHs).

15. Communication apparatus for a communication system, the communication apparatus comprising:
a controller adapted:
to operate a cell via which at least one communication device can communicate with the communication apparatus, wherein the cell is operated as a licensed assisted access, LAA, cell and has an associated physical uplink control channel, PUCCH, wherein the LAA cell is operated as LAA secondary cell, LAA SCell that is subjected to a listen-before-talk (LBT) requirement; and
a transceiver adapted:
to receive at least one uplink control signal from said communication device in said PUCCH, and
to receive, from the at least one communication device, a number of uplink control signals blocked by the LBT.

16. A method performed by communication device of a communication system, the method comprising:
communicating with a communication apparatus that operates a cell within which the communication device is located, wherein the cell is operated as a licensed assisted access, LAA, cell and has an associated physical uplink control channel, PUCCH, wherein the LAA cell is operated as LAA secondary cell, LAA SCell that is subjected to a listen-before-talk (LBT) requirement;
generating at least one uplink control signal for transmitting to said communication apparatus;
performing a clear channel assessment, CCA, in accordance with an associated LBT requirement, on said PUCCH before said at least one uplink control signal is transmitted;
blocking transmission of said at least one uplink control signal on said PUCCH when said CCA indicates that a channel is not clear; and
transmitting said at least one uplink control signal to said communication apparatus in said PUCCH when said transmission is not blocked, and
transmitting, to the communication apparatus, a number of uplink control signals blocked by the LBT.

17. A method performed by communication apparatus of a communication system, the method comprising:
operating a cell via which at least one communication device can communicate with the communication apparatus that operates, wherein the cell is operated as a licensed assisted access, LAA, cell and has an associated physical uplink control channel, PUCCH, wherein the LAA cell is operated as LAA secondary cell, LAA SCell that is subjected to a listen-before-talk (LBT) requirement; and receiving at least one uplink control signal from said communication device in said PUCCH, and receiving, from the at least one communication device, a number of uplink control signals blocked by the LBT.

* * * * *